Oct. 11, 1927.

E. P. JOHNSON 1,644,884

FISH LURE

Filed Jan. 12, 1927

Inventor

EDW. P. JOHNSON.

By

Geo. Stevens.

Attorney

Patented Oct. 11, 1927.

1,644,884

UNITED STATES PATENT OFFICE.

EDWARD P. JOHNSON, OF SUPERIOR, WISCONSIN.

FISH LURE.

Application filed January 12, 1927. Serial No. 160,656.

This invention relates to fish lures and has special reference to what is known in the art as a weedless lure, or hook.

The principal object of the invention is to provide a more practical and efficient device of this character than heretofore known.

Other objects and advantages of the invention will appear in the further description thereof.

Referring now to the accompanying drawing, forming part of this application, and wherein like reference characters indicate like parts:

Figure 1:
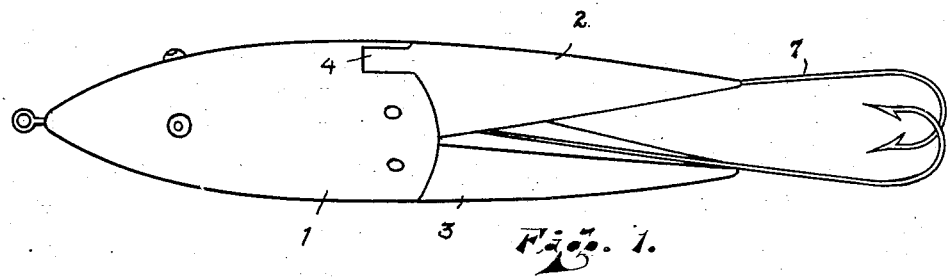
Figure 1 is a side elevation of the lure, partly tipped from its natural upright position for convenience in illustrating its shape.
Figure 2:
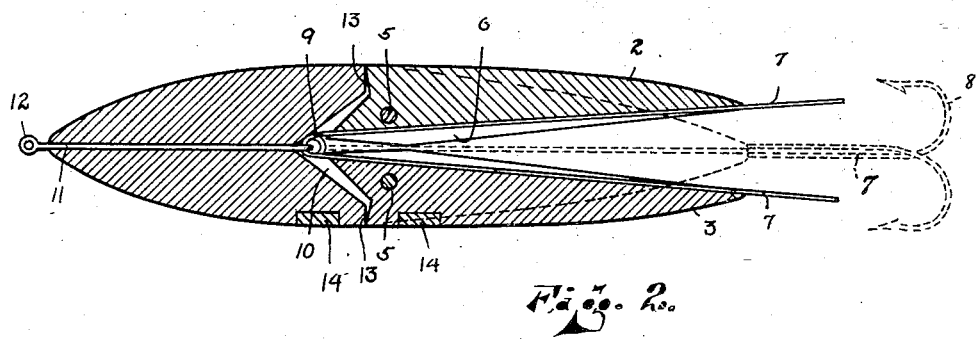
Figure 2 is a central vertical section longitudinally of the lure with the hooks omitted but showing same in dotted lines as they would appear when the lure is contracted.
Figure 3:
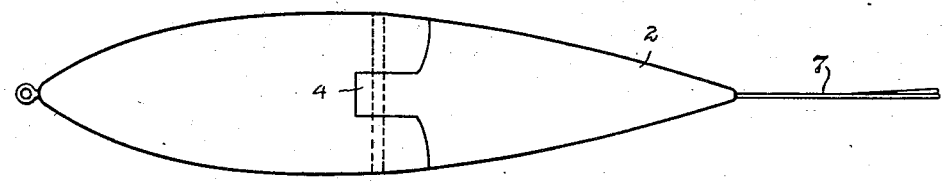
Figure 3 is a top plan view.

The front body portion 1 of the lure is circular in cross section and tapered gradually to the nose forming a cone shaped head, with suitable eyes or other means indicative of animal life. The rear body portion is divided into two tail-like sections 2 and 3, they being spaced apart with said space increasing rearwardly to the terminals thereof, and with the opposed faces of the tail sections being flat while their outer surfaces are rounded and tapered to conform with the forward body portion, the tapered or converging sides extending rearwardly to the extremities thereof.

Each tail portion 2 and 3 is formed with a reduced rectangularly shaped tenon-like portion 4 which fits into the morticed or recessed end of the body portion 1, and is pivotally attached therewithin as by the transverse pins 5, the shoulder upon either side of the tenon being arcuate in form, so as to produce as nearly a tight joint as possible during either the closed or open position of the tail sections.

A channel or groove indicated at 6 is formed centrally and longitudinally of the inner faces of each tail section, in which groove is carried the spring wire 7, which also forms the shank of the catching hooks 8. This wire 7 extends inwardly to a point slightly beyond the inner ends of the tail sections 2 and 3 where it is turned once upon itself forming a loop or bight as at 9 within the angular chamber 10 of the body portion 1. A lead wire 11 is attached to the loop or bight 9 and extends through the axial hole of the head to a point just forward of same where a suitable eye 12 may be formed therein for engagement with the swivel of the fish line, or the like.

The wire 7, as before stated, is a spring wire and so formed as to normally keep the tail sections separated as shown in the drawings, with the front shoulder 13 of each tenon abutting a like shoulder in the mortice of the body section 1, and the hooks 8 on the termini of the wire 7 are turned inwardly facing each other so that normally they overlap as shown in Figure 1 with the hooks shielded by the loops thereof, so that when a fish or other creature to be caught graps the tail end of the lure it is obvious the pinching together of same will expose the hooks for instant engagement, forming an adequate and positive catching means.

Any desired form of weight may be installed as indicated at 14 in the lower body portion of the lure to make it normally remain right side up while in the water, it being constructed of wood or other buoyant material.

I do not wish to be confined to the exact embodiment here illustrated but claim as my invention any structure falling within the terms of the appended claims, which are as follows:

1. A lure of the class described comprising a substantially conically shaped front body portion recessed in its after end, two normally spaced tail sections pivotally mounted within the recess of the forward body portion, means for holding the tail sections in spaced relation, said means terminating in fish hooks.

2. A lure of the type described comprising a front body portion, a two-part exposed tail portion, means for holding the tail portions in spaced relation to each other, means for pivotally attaching the tail portions to the front body portion, and fish hooks attached to the rearmost extremities of the tail portion in such a manner that their barbs normally overlap each other within the limits of their shanks.

3. A three-part pivotally united fish lure comprising a body portion having spaced like tail portions pivotally united therein forming in contour a continuation of the body portion, said tail portions carrying hooks for the purpose described.

In testimony whereof I affix my signature.

EDWARD P. JOHNSON.